United States Patent

Hara et al.

[11] Patent Number: 5,966,998
[45] Date of Patent: Oct. 19, 1999

[54] STRUCTURE FOR MOUNTING REVERSE IDLER GEAR IN MANUAL TRANSMISSION

[75] Inventors: Tomoyuki Hara; Toshiyuki Yamaguchi, both of Kanagawa; Koichi Asaga, Nagoya, all of Japan

[73] Assignees: Nissan Motor Co., Ltd., Yokohama; Aichi Machine Industry Co., Ltd., Nagoya, both of Japan

[21] Appl. No.: 09/037,713

[22] Filed: Mar. 10, 1998

[51] Int. Cl.$^6$ .............................. F16H 61/26; F16H 57/02
[52] U.S. Cl. ........................................... 74/606 R; 74/335
[58] Field of Search ......................... 74/606 R, 331–335, 74/15.6, 15.66, 15.63; 60/487, 488, 490, 454; 475/72, 206; 180/53.1, 53.6

[56] References Cited

U.S. PATENT DOCUMENTS

| | | | |
|---|---|---|---|
| 4,223,570 | 9/1980 | Yamamori et al. | 74/695 |
| 4,242,923 | 1/1981 | Nishikawa et al. | 74/606 R X |
| 4,261,227 | 4/1981 | Yamamori et al. | 74/606 R X |
| 5,058,455 | 10/1991 | Nemoto et al. | 74/606 R |
| 5,058,459 | 10/1991 | Nemoto et al. | 74/606 R X |
| 5,142,940 | 9/1992 | Hasegawa | 60/487 X |
| 5,509,329 | 4/1996 | Jackson et al. | 74/606 R |
| 5,570,605 | 11/1996 | Kitagawara et al. | 74/606 R X |
| 5,690,001 | 11/1997 | Matsufuji | 74/335 X |

FOREIGN PATENT DOCUMENTS 0 854 621  11/1994  European Pat. Off. .

OTHER PUBLICATIONS

"Service Manual" issued from Mitsubishi Motor Co., Ltd on Oct. 1994 (3 pages).

*Primary Examiner*—Vinh T. Luong
*Attorney, Agent, or Firm*—Foley & Lardner

[57] ABSTRACT

A reverse idler gear mounting structure is easily and reliably assembled in a manual transmission. The transmission has a transmission case with an end wall and a side wall, input and main shafts extending in parallel in the transmission case and having rear ends directed toward the end wall, mutually engaged input and main gears operatively mounted on the input and main shafts respectively, synchronizing mechanisms operatively incorporated with the input and main gears to provide the transmission with a selected gear ratio, reverse input and main gears operatively disposed on the input and main shafts respectively, an idler shaft fixed to the rear wall and a reverse idler gear rotatably disposed on the idler shaft while meshing with both the reverse input and main gears. The reverse idler gear mounting structure comprises a first through bore formed in the rear wall, the first through bore extending in parallel with the input and main shafts and having a size to permit insertion of the idler shaft into the transmission case therethrough; a second through bore arranged coaxial with the first through bore and formed in an inner wall which extends inward from the side wall, the inner wall being spaced apart from the end wall so that a given space is left between the first and second through bores; and a parts-inserting opening formed in the side wall near the end wall, the parts-inserting opening being so sized as to permit insertion of the reverse idler gear into the given space therethrough. The idler shaft has axially opposed first and second end portions respectively received in the first and second through bores leaving a center shaft portion thereof in the given space. The center shaft portion has the reverse idler gear rotatably disposed thereon.

15 Claims, 6 Drawing Sheets

STRUCTURE FOR MOUNTING REVERSE IDLER GEAR IN MANUAL TRANSMISSION

The contents of Japanese Patent Application 9-66690, with filing date Mar. 19, 1997 in Japan, are hereby incorporated by reference.

BACKGROUND OF THE INVENTION

1. Field of the Invention

The present invention relates in general to manual transmissions for a motor vehicle, and more particularly to structures for mounting a reverse idler gear in the transmission.

2. Description of the Prior Art

For clarifying the task of the present invention, one conventional structure for mounting a reverse idler gear in a manual transmission will be described with reference to FIGS. 8 and 9 of the accompanying drawings.

In FIG. 8, there is shown a manual transmission to which the conventional reverse idler gear mounting structure is practically applied. The transmission is of a type having five forward speeds and one reverse.

The transmission comprises a transmission case 2 in which an input shaft 6 and a main shaft 10 are arranged in parallel with each other. The input shaft 6 is rotatably held by bearing units 4a and 4b installed in the transmission case 2, and the main shaft 10 is rotatably held by bearing units 8a and 8b installed in the case 2.

The input shaft 6 has a front end (or right end in FIG. 8) exposed to an interior of a clutch housing 2a which constitutes part of the transmission case 2. Within the clutch housing 2a, there is arranged a clutch (not shown) to which the front end of the input shaft 6 is connected. That is, when the clutch is engaged, a power from an engine (not shown) is transmitted to the input shaft 6 through the clutch. While, when the clutch is disengaged, the power transmission from the engine to the input shaft 6 is intercepted.

The input shaft 6 has first, second and fifth speed input gears 6a, 6b and 6e and a reverse input gear 6f which are integral with or connected to the input shaft 6 to rotate therewith. As shown, the reverse input gear 6f is formed on the left end portion of the input shaft 6. The input shaft 6 has further third and fourth speed input gears 6c and 6d which are rotatably disposed thereon. As shown, the six input gears 6a, 6b, 6c, 6d, 6e and 6f are aligned in order.

The main shaft 10 is formed at its front portion with an output gear 11 which is engaged with a final gear 18a of a differential gear unit 18. The main shaft 10 has first, second, third, fourth and fifth speed main gears 10a, 10b, 10c, 10d and 10e which are respectively engaged with the first, second, third, fourth and fifth input gears 6a, 6b, 6c, 6d and 64 of the input shaft 6. The first, second and fifth speed main gears 10a, 10b and 10e are rotatably disposed about the main shaft 10, while the third and fourth speed main gears 10c and 10d are connected to the main shaft 10 to rotate therewith. Rotatably disposed about the rear end of the main shaft 10 is a reverse main gear 10f. The reverse main gear 10f is engaged with the reverse input gear 6f of the input shaft 6 through a reverse idler gear 20 which is rotatably held in the transmission case 2.

Around the main shaft 10 between the first and second speed main gears 10a and 10b, there is arranged a 1–2 synchronizing mechanism 12, around the main shaft 10 between the fifth speed main gear 10e and the reverse main gear 10f, there is arranged a 5-R synchronizing mechanism 14, and around the input shaft 6 between the third and fourth speed input gears 6c and 6d, there is arranged a 3–4 synchronizing mechanism 16.

When, due to operation of selected one of shift forks (not shown), the synchronizing mechanism 12, 14 or 16 is actuated to achieve a fixed connection of the main gear 10a, 10b, 10e or 10f to the main shaft 10 or a fixed connection of the input gear 6c or 6d to the input shaft 6, a certain gear train is established in the transmission. With this, the engine power is transmitted to a drive shaft of the differential gear unit 18 while being changed in rotation speed and in a certain case in rotation direction.

With the above-mentioned arrangement, the manual transmission can be constructed compact in size and light in weight. This is because the reverse idler gear 20 has no need to move axially and the reverse mechanism (that is, the mechanism including the reverse input gear 6f, the reverse main gear 10f and the reverse idler gear 20) can be operated by actuating the 5-R synchronizing mechanism 14 which serves also as means for establishing the fifth gear speed.

In the reverse mechanism, the reverse idler gear 20 is rotatably disposed about an idler shaft 22 through a bearing unit 24. The idler shaft 22 extends in parallel with the input and main shafts 6 and 10.

As is shown in FIG. 9, the idler shaft 22 comprises a center shaft portion 22a about which the bearing unit 24 is arranged, a smaller diameter end portion 22b which coaxially extends from one end of the center shaft portion 22a, a larger diameter discal end portion 22c which coaxially extends from the other end of the center shaft portion 22a and a sectoral block portion 22f which extends from the discal end portion 22c. As shown, the sectoral block portion 22f has a cylindrical outer surface 22d which is flush with a peripheral cylindrical surface of the discal end portion 22c. The sectoral block portion 22f is formed at the cylindrical surface 22d with a threaded bolt hole 22e.

As is shown in FIG. 8, an end wall 2b of the transmission case 2 is formed at its inner surface with a smaller circular recess 2c into which the smaller diameter end portion 22b of the idler shaft 22 is tightly received. A side wall 2d of the transmission case 2 is formed at its inner surface with a concave part $2d_1$ with which the cylindrical outer surface 22d of the idler shaft 22 intimately engages. The side wall 2d is formed at the concave part $2d_1$ with a bolt opening 28 through which a threaded bolt 30 inserts into and engages with the threaded bolt hole 22e of the idler shaft 22. As is mentioned hereinabove, the reverse idler gear 20 is rotatably disposed on the idler shaft 22 through the bearing unit 24. A washer 26 is disposed on the smaller diameter end portion 22b to operatively hold both the reverse idler gear 20 and the bearing unit 24 on the idler shaft 22.

Although not well shown in FIG. 8, the side wall 2d of the transmission case 2 is further formed near the concave part $2d_1$ with a parts-inserting opening whose axial length is denoted by reference "$L_1$" in the drawing. The axial length "$L_1$" is greater than the axial length of the idler shaft 22.

For mounting the reverse idler gear 20 to a right position in the transmission case 2, the following steps are taken.

First, at open space, a semi-assembled unit is prepared. That is, the bearing unit 24, the washer 26 and the reverse idler gear 20 are attached to the idler shaft 22 to constitute the semi-assembled unit. Then, the semi-assembled unit is inserted into the transmission case 2 through the parts-inserting opening of the same. Then, the semi-assembled unit is manually set, so that the smaller diameter end portion 22b of the idler shaft 22 is put in the recess 2c of the end wall 2b and the cylindrical outer surface 22d of the sectoral block portion 22f of the idler shaft 22 is intimately mated with the concave part $2d_1$ of the side wall 2d. After registering the threaded bolt hole 22e of the sectoral block portion 22f with the bolt opening 28 of the side wall 2d, the threaded bolt 30 is inserted into the registered holes and engaged with the threaded bolt hole 22e. With this, the semi-assembled unit is tightly held in the transmission case 2 as is shown in FIG. 8. Upon assemblage of the unit, the reverse idler gear 20 is arranged between the reverse input gear 6f and the reverse main gear 10f while properly meshing with them.

However, due to its inherent construction, the above-mentioned reverse idler gear mounting structure has failed to satisfy the users because of the following reasons.

First, due to the complicated shape of the idler shaft 22 (see FIG. 9), production of it needs a highly precise and time-consumed machining work, which inevitably induces increased cost of the shaft 22, and thus, that of the entire of the reverse idler gear mounting structure.

Second, it is difficult or at least troublesome to insert the semi-assembled unit into the right position in the transmission case 2 through the parts-inserting opening. In fact, the parts insertion work by using only one parts-inserting opening has its limit.

SUMMARY OF THE INVENTION

It is therefore an object of the present invention to provide a structure for mounting a reverse idler gear in a transmission case, which is free of the above-mentioned drawbacks.

According to a first aspect of the present invention, there is provided a reverse idler gear mounting structure for use in a manual transmission. The manual transmission has a transmission case with an end wall and a side wall, input and main shafts extending in parallel in the transmission case and having rear ends directed toward the end wall, mutually engaged input and main gears operatively mounted on the input and main shafts respectively, synchronizing mechanisms operatively incorporated with the input and main gears to provide the transmission with a selected gear ratio, reverse input and main gears operatively disposed on the input and main shafts respectively, an idler shaft fixed to the rear wall and a reverse idler gear rotatably disposed on the idler shaft while meshing with both the reverse input and main gears. The reverse idler gear mounting structure comprises a first through bore formed in the rear wall, the first through bore extending in parallel with the input and main shafts and having a size to permit insertion of the idler shaft into the transmission case therethrough; a second through bore arranged coaxial with the first through bore and formed in an inner wall which extends inward from the side wall, the inner wall being spaced apart from the end wall so that a given space is left between the first and second through bores; and a parts-inserting opening formed in the side wall near the end wall, the parts-inserting opening being so sized as to permit insertion of the reverse idler gear into the given space therethrough, wherein the idler shaft has axially opposed first and second end portions respectively received in the first and second through bores leaving a center shaft portion thereof in the given space, and wherein the center shaft portion has the reverse idler gear rotatably disposed thereon.

According to a second aspect of the present invention, there is provided a manual transmission which comprises a transmission case with an end wall and a side wall; input and main shafts extending in parallel in the transmission case and having rear ends directed toward the end wall; mutually engaged input and main gears operatively mounted on the input and main shafts respectively; synchronizing mechanisms operatively incorporated with the input and main gears to provide the transmission with a selected gear ratio; reverse input and main gears operatively disposed on the input and main shafts respectively; an idler shaft installed in the transmission case; a reverse idler gear rotatably disposed on the idler shaft while meshing with both the reverse input and main gears; a first through bore formed in the rear wall, the first through bore extending in parallel with the input and main shafts and having a size to permit insertion of the idler shaft into the transmission case therethrough; an inner wall extending inward from the side wall, the inner wall having a second through bore which is coaxial with the first through bore, the inner wall being spaced apart from the end wall so that a given space is defined between the first and second through bores; a parts-inserting opening formed in the side wall near the end wall, the parts-inserting opening being so sized as to permit insertion of the reverse idler gear into the given space therethrough. The idler shaft has axially opposed first and second end portions respectively received in the first and second through bores leaving a center shaft portion thereof in the given space, and the center shaft portion has the reverse idler gear rotatably disposed thereon.

DETAILED DESCRIPTION OF THE EMBODIMENTS

Figure 1:
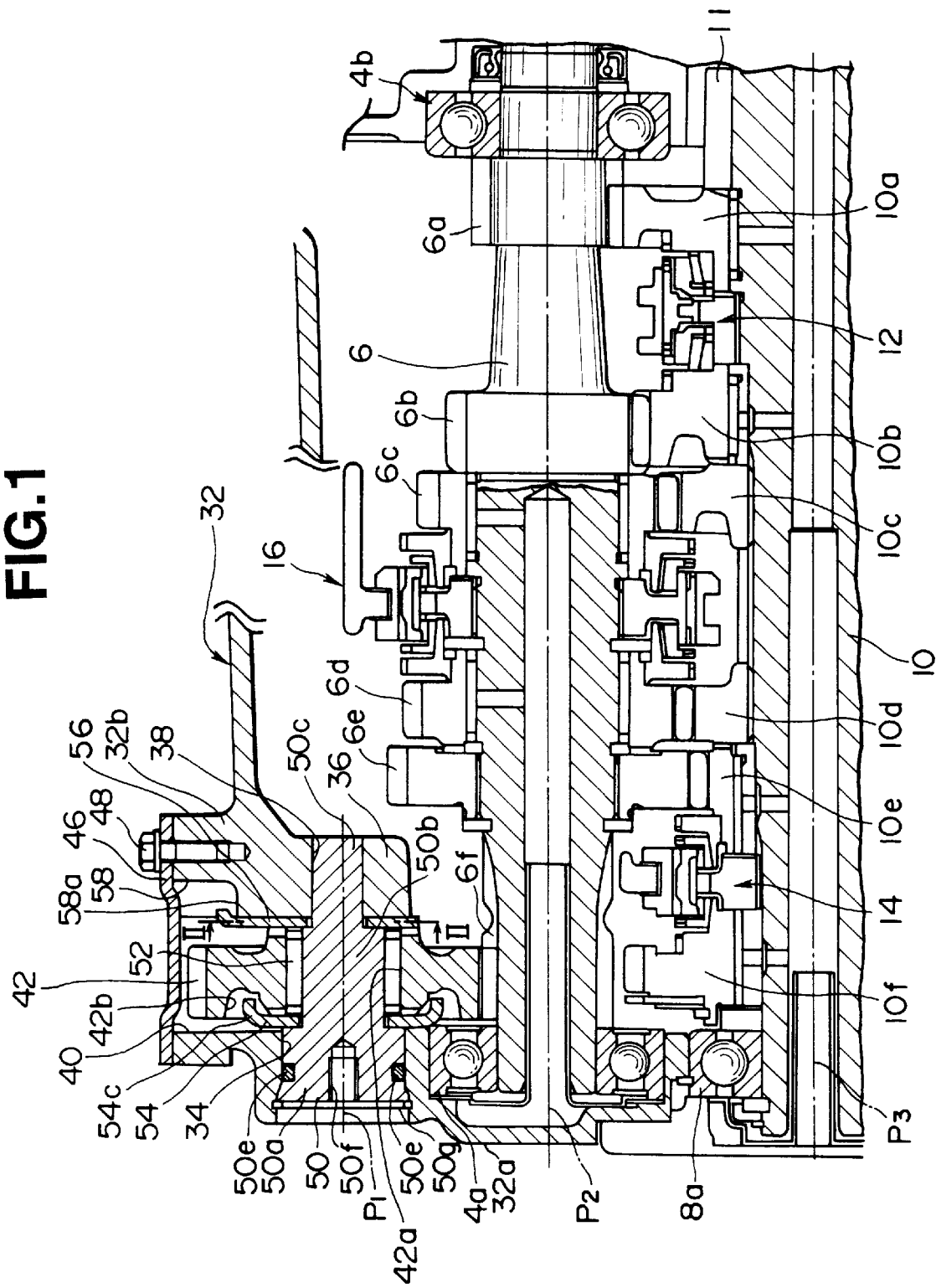
FIG. 1 is a partial and sectional view of a manual transmission to which a reverse idler gear mounting structure of a first embodiment of the present invention is practically applied.

Referring to FIGS. 1 to 6 of the drawings, particularly FIG. 1, there is shown a manual transmission to which a reverse idler gear mounting structure of a first embodiment of the present invention is practically applied.

As is seen from FIG. 1, the manual transmission comprises a transmission case 32 in which an input shaft 6 and a main shaft 10 are installed and extend in parallel with each other. Axes of these two shafts 6 and 10 are denoted by references "P2" and "P3", respectively. A rear end of the input shaft 6 is rotatably supported by a bearing unit 4b which is fixed to an end wall 32a of the transmission case 32. A front end of the input shaft 6 is rotatably held by another bearing unit 4a which is tightly held in the transmission case 32. A rear end of the main shaft 10 is rotatably held by a bearing unit 8a which is fixed to the end wall 32a of the transmission case 32, and a front end of the main shaft 10 is rotatably held by another bearing unit (not shown) tightly held in the transmission case 32.

A first speed input gear 6a, a second speed input gear 6b and a reverse input gear 6f are integrally formed on the input shaft 6. A fifth speed input gear 6e is secured to the input shaft 6 through a spline-connection to rotate therewith. Third and fourth speed input gears 6c and 6d are rotatably disposed about the input shaft 6 through respective bearing units (no numerals).

An output gear 11 is integrally formed on the main shaft 10, and third and fourth speed main gears 10c and 10d are secured to the main shaft 10 through a spline-connection to rotate therewith. A first speed main gear 10a, a second speed main gear 10b, a fifth speed main gear 10e and a reverse main gear 10f are rotatably disposed about the main shaft 10 through respective bearing units (no numerals). As shown, the first and second speed input gears 6a and 6b are constantly meshed with the first and second speed main gears 10a and 10b respectively. The third and fourth speed input gears 6c and 6d are constantly meshed with the third and fourth speed main gears 10c and 10d respectively. The fifth speed input gear 6e is constantly meshed with the fifth speed main gear 10e. The reverse input gear 6f is engaged with the reverse main gear 10f through a reverse idler gear 42 which will be described in detail hereinafter.

Around the main shaft 10 between the first and second speed main gears 10a and 10b, there is arranged a 1–2 synchronizing mechanism 12, around the main shaft 10 between the fifth speed main gear 10e and the reverse main gear 10f, there is arranged a 5-R synchronizing mechanism 14, and around the input shaft 6 between the third and fourth speed input gears 6c and 6d, there is arranged a 3–4 synchronizing mechanism 16.

When, due to operation of selected one of shift forks (not shown), the synchronizing mechanism 12, 14 or 16 is actuated to achieve a fixed connection of the main gear 10a, 10b, 10e or 10f to the main shaft 10 or a fixed connection of the input gear 6c or 6d to the input shaft 6, a certain gear train is established in the transmission. With this, the engine power is transmitted to a drive shaft of a differential gear unit (not shown) while being changed in rotation speed and in a certain case in rotation direction.

As is seen from FIG. 1, the reverse idler gear 42 is rotatably held on an idler shaft 50 which is fixed to the transmission case 32. That is, in the end wall 32a of the transmission case 32, there is formed a first through bore 34 whose axis "$P_1$" is in parallel with the axis "$P_2$" of the input shaft 6, and thus with the axis "$P_3$" of the main shaft 10.

A side wall 32b of the transmission case 32 is integrally formed with an inwardly extending inner wall 36 which is spaced from the end wall 32a. The inner wall 36 is formed with a second through bore 38 which is coaxial with the above-mentioned first through bore 34. That is, the first and second through bores 34 and 38 have the common axis "$P_1$". For the reason which will become apparent hereinafter, the second through bore 38 has at its cylindrical inner wall a flat wall part 38a, as is seen from FIG. 2.

Figure 3:
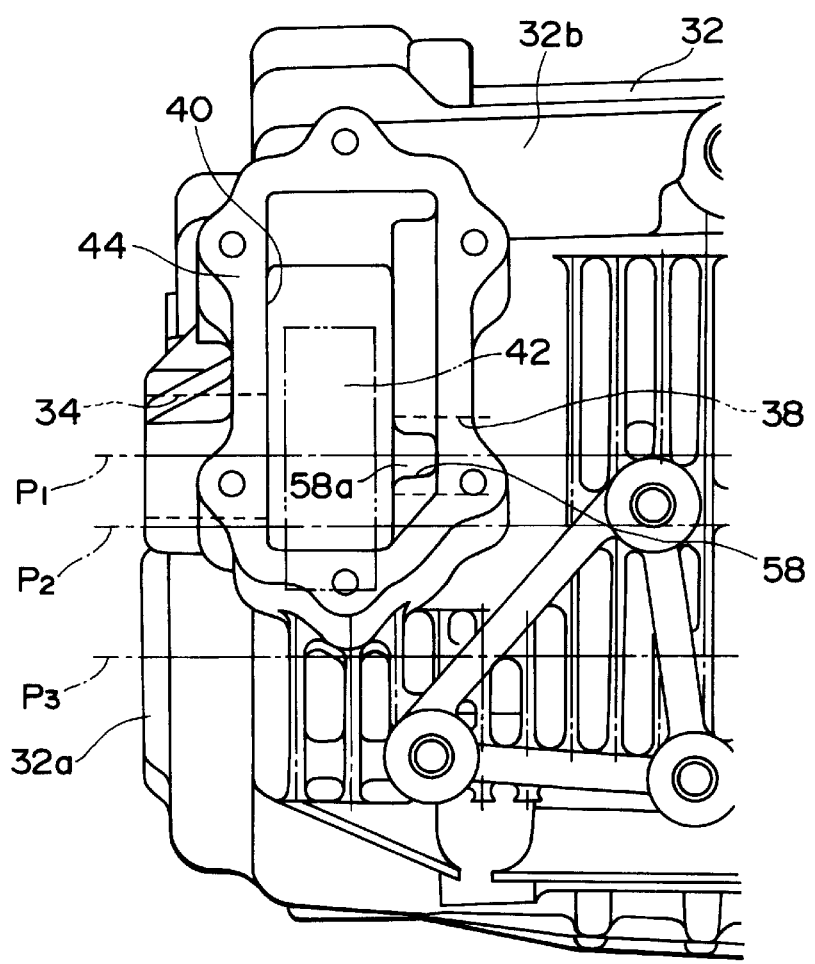
FIG. 3 is an external view of a transmission case at a portion where a parts-inserting opening is provided.

As is seen from FIG. 3, the side wall 32b of the transmission case 32 is formed, near the first and second through bores 34 and 38, with a parts-inserting square opening 40. That is, the opening 40 is exposed to a space defined between the first and second through bores 34 and 38. The opening 40 is so sized as to permit insertion of the reverse idler gear 42 therethrough into the space between the bores 34 and 38. The opening 40 is formed around its periphery with a flange 44 to which a lid member 46 (see FIG. 1) is intimately connectable through bolts 48.

As is seen from FIG. 1, the idler shaft 50 is received in both the first and second through bores 34 and 38. The idler shaft 50 comprises a center shaft portion 50b about which the reverse idler gear 42 is rotatably disposed through a needle bearing unit 52, a larger diameter end portion 50a which is received in the first through bore 34 and a smaller diameter end portion 50c which is received in the second through bore 38. That is, the center shaft portion 50b is placed in the space defined between the first and second through bores 34 and 38.

The larger diameter end portion 50a is formed with an annular groove 50d for receiving an 0-ring 50e. With this 0-ring 50e, a hermetical sealing of the larger diameter end portion 50a is achieved in the first through bore 34. Furthermore, the larger diameter end portion 50a is formed at its rear center exposed portion with a threaded bolt hole 50f. That is, when it becomes necessary to pull out the idler shaft 50 from the set position, a bolt (not shown) is screwed into the opening 50f and pulled outward. A snap ring 50g is detachably fixed to a mouth portion of the first through bore 34 to hold the idler shaft 50 in position. For receiving the snap ring 50g, the mouth portion is formed with an annular groove (no numeral).

The needle bearing unit 52 on the center shaft portion 50b 30 of the idler shaft 50 is intimately received in a center circular opening 42a of the reverse idler gear 42.

Figure 2:
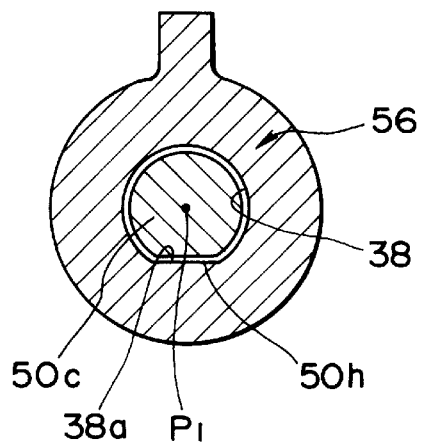
FIG. 2 is a sectional view taken along the line II—II of FIG. 1.

As is seen from FIG. 2, the smaller diameter end portion 50c has at its cylindrical outer wall a flat wall part 50h which is mated with the flat wall part 38a of the second through bore 38. With this mating, rotation of the idler shaft 50 about the axis "$P_1$" is suppressed.

As is understood from FIG. 1, the reverse idler gear 42 is formed at its rear surface with an annular groove 42b. As is seen from FIGS. 1 and 3, the inner wall 36 is formed at its rear surface with a recess or cut 58 which extends inward from the parts-inserting opening 40. A bottom wall of the recess 58 which faces the parts-inserting opening 40 is denoted by numeral 58a. As shown, the recess 58 is so shaped and sized as not to severely affect the rigidity and/or shaft supporting ability of the inner wall 36.

Around the center shaft portion 50b and the smaller end portion 50c of the idler shaft 50, there are disposed first and second washes 54 and 56 in such a manner that they put therebetween the reverse idler gear 42 and the needle bearing unit 52.

Figure 4:
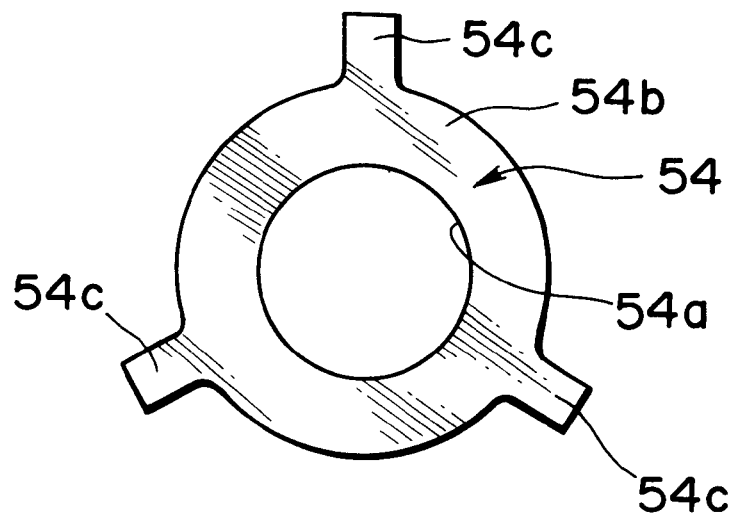
FIG. 4 is a plan view of a first washer employed in the structure of the first embodiment of the present invention.

The detail of the first washer 54 is shown in FIG. 4. As shown, the first washer 54 comprises an annular portion 54b which has a center opening 54a and three equally spaced pawl portions 54c which extend radially outward form the annular portion 54b. The diameter of the center opening 54a is slightly larger than the diameter of the center shaft portion 50b of the idler shaft 50 (see FIG. 1). As is seen from FIG. 1, the first washer 54 is received on the center shaft portion 50b of the idler shaft 50 having the three pawl portions 54c bent into the annular groove 42b of the reverse idler gear.

Figure 5:
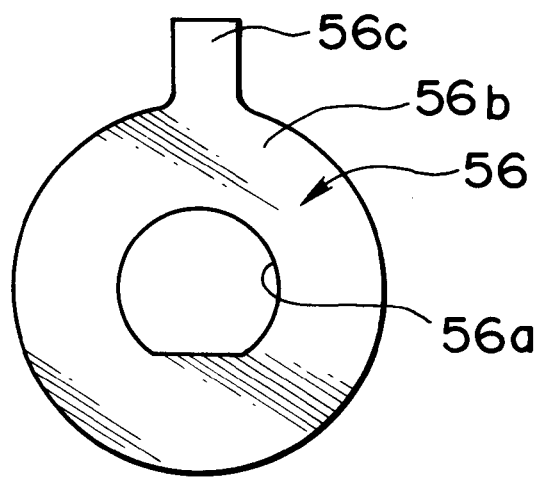
FIG. 5 is a plan view of a second washer employed in the structure of the first embodiment of the present invention.
Figure 6:
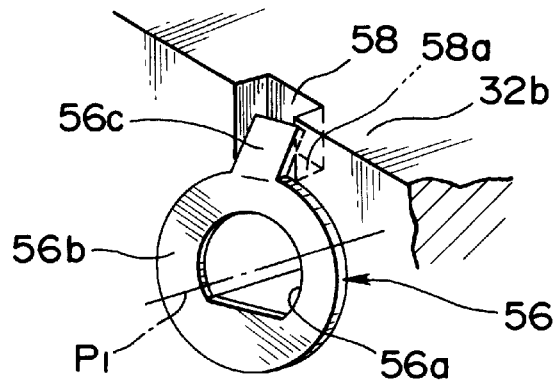
FIG. 6 is a perspective view of the structure of the first embodiment at a portion where a pawl portion of the second washer of FIG. 5 is engaged with a recess formed in an inner wall of the transmission case.

The detail of the second washer 56 is shown in FIG. 5. As shown, the second washer 56 comprises an annular portion 56b which has a center opening 56a and a single pawl portion 56c which extends radially outward from the annular portion 56b. The diameter of the center opening 56a is slightly larger than the diameter of the smaller diameter end portion 50c of the idler shaft 50 (see FIG. 1). To register with the smaller diameter end portion 50c, the center opening 56a has a flat part as shown. As is seen from FIG. 1, the second washer 56 is received on the smaller diameter end portion 50c of the idler shaft 50 having the single pawl portion 56c bent into the recess 58 of the inner wall 36.

For mounting the reverse idler gear 42 to the right position in the transmission case 32, the following steps are taken.

First, at open space, all of the parts of the reverse idler gear mounting structure are prepared. The second washer 56 (see FIG. 5) is selected and the single pawl portion 56c thereof is bent at a given angle. Then, the second washer 56 is inserted into the case 32 through the parts-inserting opening 40. Then, as is understood from FIG. 6, with the pawl portion 56c put on the bottom wall 58a of the recess 58, the second washer 56 is so set that the center opening 56a thereof registers with the second through bore 38 of the inner wall 36. Then, at open space, that is, outside of the transmission case 32, the needle bearing unit 52 is put into the center opening 42a of the reverse idler gear 42, and the first washer 54 is attached to the reverse idler gear 42 by bending the three pawl portions 54c into the annular groove 42b of the gear 42. The first washer 54 is so set that the center opening 54a thereof registers with the inner opening of the needle bearing unit 52. With this, a semi-assembled unit is prepared, which comprises the reverse idler gear 42, the needle bearing unit 52 and the first washer 54.

Then, the semi-assembled unit is inserted into the transmission case 32 through the parts-inserting opening 40, and put into the space defined between the first and second through bores 34 and 38. During this, the reverse idler gear 42 is meshed with both the reverse input gear 6f and the reverse main gear 10f.

Then, the idler shaft 50 is inserted into the first through bore 34 of the end wall 32a from the outside and pushed forward while making the center shaft portion 50b thereof slide in the inner opening of the needle bearing unit 52 and the smaller diameter end portion 50c thereof slide in the second through bore 38. When the insertion of the idler shaft 50 is completed, the snap ring 50g is fitted to the mouth portion of the first through bore 34 to hold the idler shaft 50 in position. With this, the reverse idler gear 42 is properly mounted in the transmission case 32 in such a manner as is shown in FIG. 1. Finally, the lid member 46 is fixed to the flange 44 of the parts-inserting opening 40 by means of bolts 48.

Figure 7:
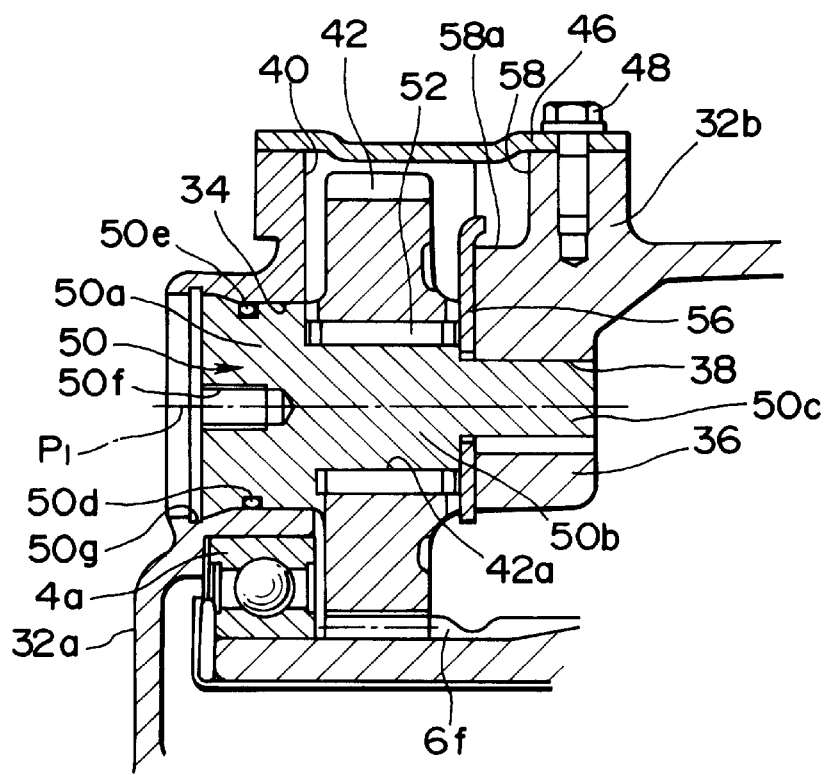
FIG. 7 is a sectional view of a reverse idler gear mounting structure of a second embodiment of the present invention.
Figure 8:
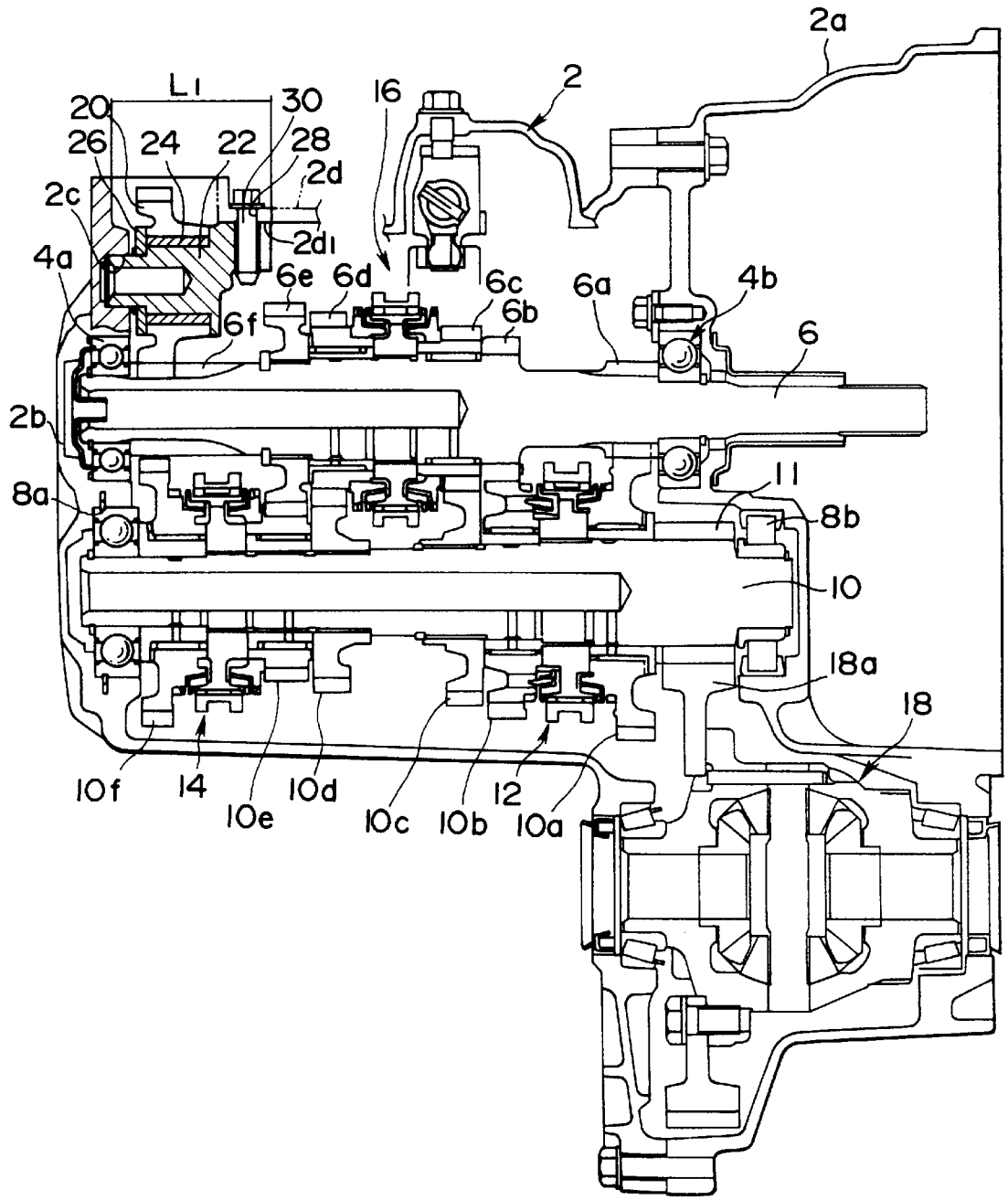
FIG. 8 is a sectional view of a manual transmission to which a conventional reverse idler gear mounting structure is applied.
Figure 9:
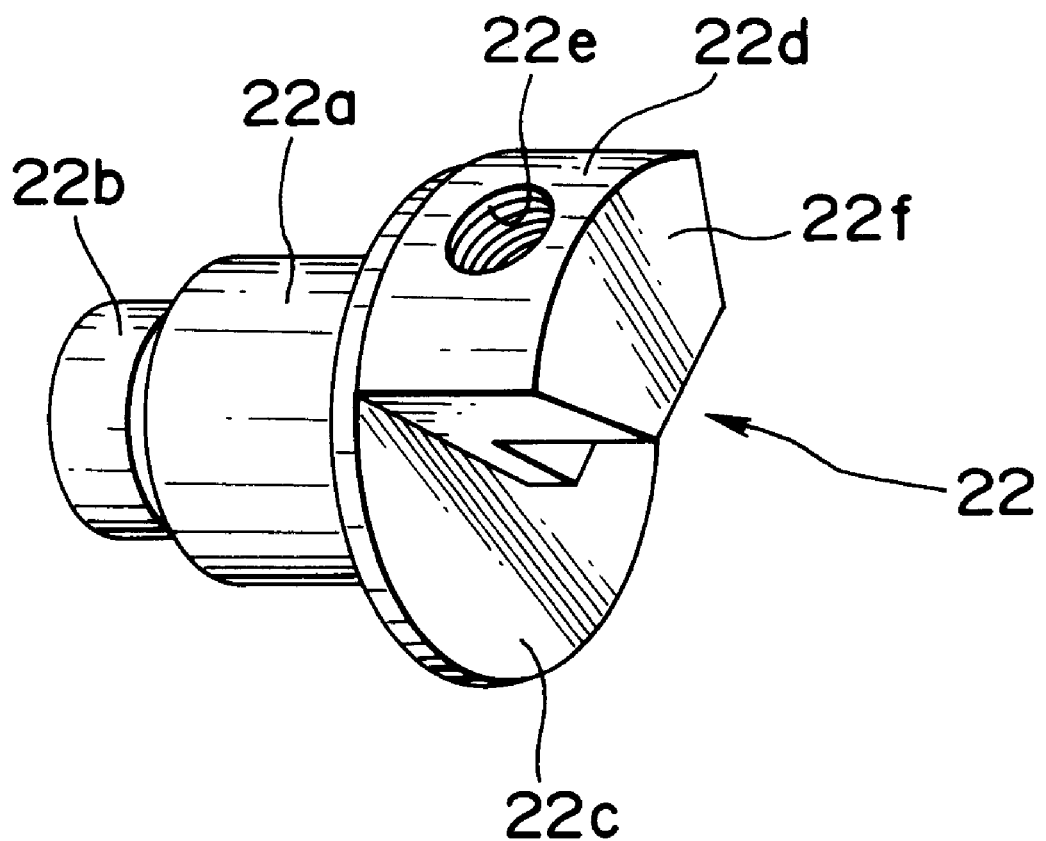
FIG. 9 is a perspective view of an idler shaft used in the conventional reverse idler gear mounting structure.

Referring to FIG. 7, there is shown a reverse idler gear mounting structure of a second embodiment of the present invention. In this embodiment, there is no member which corresponds to the first washer 54 employed in the first embodiment. That is, in the second embodiment, the larger diameter end portion 50a of the idler shaft 50 directly contacts a rear part of the reverse idler gear 42. Due to absence of the first washer 54, there is no need of providing the reverse idler gear 40 with a groove which corresponds to the annular groove 42b employed in the first embodiment.

In the following, advantages of the above-mentioned reverse idler gear mounting structures of the present invention will be described.

First, because the idler shaft 50 is simple in construction, it is easy and thus economical to produce the same. That is, there is no need of using a highly precise and time-consumed machining work for producing the idler shaft 50. Thus, the cost of the entire of the reverse idler gear mounting structure can be reduced.

Second, due to provision of two parts-inserting openings (viz., the parts-inserting square opening 40 and the first through bore 34), it is easy to insert the parts of the reverse idler gear mounting structure into the transmission case 32. Due to the same reason, the parts can be easily assembled in the transmission case 32.

Third, because the idler shaft 50 is supported by two wall portions (viz., the rear wall 32a and the inner wall 36) which are integral with the transmission case 32, the idler shaft 50 can assuredly and reliably support the reverse idler gear 42.

Fourth, since the size of the parts-inserting opening 40 can be reduced by a certain degree so long as it permits insertion of the semi-assembled unit (viz., the unit including the reverse idler gear 42, the needle bearing unit 52 and the first washer 54), the inevitable lowering in rigidity of the transmission case 32 can be minimized.

Fifth, due to provision of the pawl portion 56c, the second washer 56 can be easily attached to the inner wall 36. This facilitates the work for assembling the gear mounting structure of the present invention. The pawl portion 56c can serve as a stopper for stopping rotation of the idler shaft 50.

Sixth, particularly in the first embodiment of FIG. 1, due to the pawl portions 54c which engage the annular groove 42b of the reverse idler gear 42, the first washer 54 can be easily attached to the reverse idler gear 42. This facilitate the work for assembling the gear mounting structure of the invention.

What is claimed is:

1. In a manual transmission having a transmission case with an end wall and a side wall, input and main shafts extending in parallel in the transmission case and having rear ends directed toward said end wall, mutually engaged input and main gears operatively mounted on the input and main shafts respectively, synchronizing mechanisms operatively incorporated with said input and main gears to provide the transmission with a selected gear ratio, reverse input and main gears operatively disposed on said input and main shafts respectively, an idler shaft fixed to said rear wall and a reverse idler gear rotatably disposed on said idler shaft while meshing with both said reverse input and main gears, a reverse idler gear mounting structure comprising:
  a first through bore formed in said rear wall, said first through bore extending in parallel with said input and main shafts and having a size to permit insertion of said idler shaft into the transmission case therethrough;
  a second through bore arranged coaxial with said first through bore and formed in an inner wall which extends inward from said side wall, said inner wall being spaced apart from said end wall so that a given space is left between said first and second through bores; and
  a parts-inserting opening formed in said side wall near said end wall, said parts-inserting opening being so sized as to permit insertion of said reverse idler gear into said given space therethrough,
  said idler shaft having axially opposed first and second end portions respectively received in said first and second through bores leaving a center shaft portion thereof in said given space, said center shaft portion having said reverse idler gear rotatably disposed thereon.

2. A reverse idler gear mounting structure as claimed in claim 1, which is assembled by:
  (a) inserting said reverse idler gear into said given space through said parts-inserting opening;
  (b) holding said reverse idler gear in said given space in such a manner that a center circular opening of said reverse idler gear is coaxial with said first and second through bores;

(c) inserting said idler shaft into said first through bore from outside of said end wall; and (d) continuing the insertion of said idler shaft until the idler shaft assumes a condition wherein said axially opposed first and second end portions of said idler shaft are received in said first and second through bores and said center shaft portion of said idler shaft is received in said center circular opening of said reverse idler gear.

3. A reverse idler gear mounting structure as claimed in claim 1, further comprising:

a recess formed in said inner wall at a surface facing said parts-inserting opening; and first and second washers disposed about said center shaft portion of said idler shaft in a manner to put therebetween said reverse idler gear, thereby to suppress an axial displacement of said reverse idler gear on and along said idler shaft, said second washer having a radially outwardly extending pawl portion which is bent to be received in said recess.

4. A reverse idler gear mounting structure as claimed in claim 3, further comprising:

an annular groove formed in one side surface of said reverse idler gear; and a plurality of pawl portions extending radially outward from said first washer, said pawl portions being bent to be received in said annular groove.

5. A reverse idler gear mounting structure as claimed in claim 4, further comprising a needle bearing unit which is disposed between said center shaft portion of said idler shaft and said reverse idler gear to smooth rotation of said reverse idler gear about said center shaft portion.

6. A reverse idler gear mounting structure as claimed in claim 5, which is assembled by:

(a) inserting said second washer into said given space through said parts-inserting opening and attaching the same to said inner wall by putting the bent pawl portion into said recess;

(b) preparing a semi-assembled unit which includes said reverse idler gear, said needle bearing unit concentrically received in a center circular opening of said reverse idler gear and said first washer having said pawl portions bent into said annular groove of said reverse idler gear;

(c) inserting said semi-assembled unit into said given space through said parts-inserting opening;

(d) holding said semi-assembled unit in said given space in such a manner that the center circular opening of said reverse idler gear is concentric with said first and second through bores;

(e) inserting said idler shaft into said first through bore from outside of said end wall; and (f) continuing the insertion of said idler shaft until the idler shaft assumes a condition wherein the axially opposed first and second end portions of said idler shaft are received in said first and second through bores and said center shaft portion of said idler shaft concentrically mounts thereon said semi-assembled unit.

7. A reverse idler gear mounting structure as claimed in claim 1, further comprising:

a recess formed in said inner wall at a surface facing said parts-inserting opening;

a washer disposed about said center shaft portion of said idler shaft between said inner wall and said reverse idler gear, said washer having a radially outwardly extending pawl portion which is bent to be received in said recess; and a larger diameter portion possessed by said first end portion of said idler shaft, said larger diameter portion directly contacting said reverse idler bear to suppress an axial displacement of said reverse idler gear on and along said idler shaft with an aid of said washer.

8. A reverse idler gear mounting structure as claimed in claim 1, further comprising a snap ring which is detachably fixed to a mouth portion of said first through bore to suppress disengagement of said idler shaft from said first and second through bores.

9. A reverse idler gear mounting structure as claimed in claim 1, in which the first end portion of said idler shaft is formed at an exposed end thereof with a threaded bolt hole, so that when it becomes necessary to pull out the idler shaft from said first and second through bores, a pull bolt is screwed into said threaded bolt hole and pulled outward.

10. A reverse idler gear mounting structure as claimed in claim 1, further comprising:

a first washer disposed about said center shaft portion of said idler shaft between said first end portion of said idler shaft and said reverse idler gear, said first washer having pawl portions which are bent into an annular groove formed in said reverse idler gear;

a second washer disposed about said center shaft portion of said idler shaft between said reverse idler gear and said inner wall, said second washer having a pawl portion which is bent into a recess formed in said inner wall;

a needle bearing unit operatively disposed between said center shaft portion of said idler shaft and said reverse idler gear to smooth rotation of said reverse idler gear about said center shaft portion; and a snap ring detachably fixed to a mouth portion of said first through bore to suppress disengagement of said idler shaft from said first and second through bores.

11. A reverse idler gear mounting structure as claimed in claim 10, in which the diameter of said center shaft portion of said idler shaft is smaller than that of said first end portion and larger than that of said second end portion.

12. A reverse idler gear mounting structure as claimed in claim 11, in which a cylindrical inner wall of said second through bore has a flat portion which is mated with a flat portion formed on a cylindrical outer wall of said second end portion of said idler shaft thereby suppress rotation of the idler shaft relative to said second through bore.

13. A reverse idler gear mounting structure as claimed in claim 12, further comprising an 0-ring which is operatively disposed between said first end portion of said idler shaft and an cylindrical inner wall of said first through bore.

14. A reverse idler gear mounting structure as claimed in claim 13, further comprising a lid member which is detachably connected to said parts-inserting opening to cover the same.

15. A manual transmission comprising:

a transmission case with an end wall and a side wall;

input and main shafts extending in parallel in the transmission case and having rear ends directed toward said end wall;

mutually engaged input and main gears operatively mounted on the input and main shafts respectively;

synchronizing mechanisms operatively incorporated with said input and main gears to provide the transmission with a selected gear ratio;

reverse input and main gears operatively disposed on said input and main shafts respectively;

an idler shaft installed in said transmission case;

a reverse idler gear rotatably disposed on said idler shaft while meshing with both said reverse input and main gears;

a first through bore formed in said rear wall, said first through bore extending in parallel with said input and main shafts and having a size to permit insertion of said idler shaft into the transmission case therethrough;

an inner wall extending inward from said side wall, said inner wall having a second through bore which is coaxial with said first through bore, said inner wall being spaced apart from said end wall so that a given space is defined between said first and second through bores;

a parts-inserting opening formed in said side wall near said end wall, said parts-inserting opening being so sized as to permit insertion of said reverse idler gear into said given space therethrough, wherein said idler shaft has axially opposed first and second end portions respectively received in said first and second through bores leaving a center shaft portion thereof in said given space, and wherein said center shaft portion has said reverse idler gear rotatably disposed thereon.

* * * * *